United States Patent
Choi

(10) Patent No.: US 11,495,013 B2
(45) Date of Patent: Nov. 8, 2022

(54) METHOD AND APPARATUS FOR DETECTING TARGET OBJECT

(71) Applicant: SI Analytics Co., Ltd., Daejeon (KR)

(72) Inventor: Hyunguk Choi, Daejeon (KR)

(73) Assignee: SI Analytics Co., Ltd., Daejeon (KR)

(*) Notice: Subject to any disclaimer, the term of this patent is extended or adjusted under 35 U.S.C. 154(b) by 0 days.

(21) Appl. No.: 17/591,044

(22) Filed: Feb. 2, 2022

(65) Prior Publication Data
US 2022/0245931 A1  Aug. 4, 2022

(30) Foreign Application Priority Data

Feb. 3, 2021 (KR) .......................... 10-2021-0015275
Sep. 28, 2021 (KR) .......................... 10-2021-0127727

(51) Int. Cl.
*G06V 10/82* (2022.01)
*G06V 10/774* (2022.01)

(52) U.S. Cl.
CPC .......... *G06V 10/82* (2022.01); *G06V 10/7747* (2022.01)

(58) Field of Classification Search
None
See application file for complete search history.

(56) References Cited

U.S. PATENT DOCUMENTS

| | | | |
|---|---|---|---|
| 11,042,742 B1 | 6/2021 | Yang et al. | |
| 2019/0236394 A1* | 8/2019 | Price | G06T 7/11 |
| 2021/0019617 A1 | 1/2021 | Bang | |

FOREIGN PATENT DOCUMENTS

| | | |
|---|---|---|
| JP | 2007037064 A | 2/2007 |
| KR | 1020180138189 A | 12/2018 |
| KR | 1020190119864 A | 10/2019 |
| KR | 102144706 B1 | 8/2020 |
| KR | 102158799 B1 | 9/2020 |
| KR | 1020200125502 A | 11/2020 |
| KR | 1020210010304 A | 1/2021 |

OTHER PUBLICATIONS

Fabien H. Wagner et al., "U-Net-Id, an Instance Segmentation Model for Building Extraction from Satellite Images—Case Study in the Joanópolis City, Brazil", Remote Sens. 2020, 12, 1544; doi:10.3390/rs12101544.
Min Bai et al., "DeepWatershed Transform for Instance Segmentation", arXiv:1611.08303v2 [cs.CV] May 4, 2017.
Weijia Li et al., "Semantic Segmentation-Based Building Footprint Extraction Using Very High-Resolution Satellite Images and Multi-Source GIS Data", Remote Sens. 2019, 11, 403; doi:10.3390/rs11040403.

* cited by examiner

*Primary Examiner* — Leon Flores
(74) *Attorney, Agent, or Firm* — Umberg Zipser LLP; Ryan Dean

(57) ABSTRACT

A method of detecting a target object performed by a computing device including at least one processor according to an exemplary embodiment of the present disclosure may include: receiving an input image; and generating first result information related to an area corresponding to a target object from the input image based on a trained neural network-based detection model.

12 Claims, 11 Drawing Sheets

METHOD AND APPARATUS FOR DETECTING TARGET OBJECT

CROSS-REFERENCE TO RELATED APPLICATIONS

This application claims priority to and the benefit of Korean Patent Application No. 10-2021-0015275 filed in the Korean Intellectual Property Office on Feb. 3, 2021 and Korean Patent Application No. 10-2021-0127727 filed in the Korean Intellectual Property Office on Sep. 28, 2021, the entire contents of which are incorporated herein by reference.

TECHNICAL FIELD

The present disclosure relates to a method of detecting a target object, and more particularly, to a method of detecting a target object from an input image by using a neural network.

BACKGROUND ART

With the development of image processing technology by using artificial neural networks, various methods of detecting a target object from an image by using a neural network have been disclosed.

However, when a plurality of target objects is located adjacent to each other on an image, there is a problem in that the plurality of target objects cannot be distinguished from each other and are recognized as one target object.

The problem cannot be easily solved by simply increasing the number of training data, and a separate learning method is required to separate and detect a plurality of target objects.

Korean Patent "KR2144706" discloses an apparatus and a method of detecting a road based on a convolutional neural network.

SUMMARY OF THE INVENTION

The present disclosure has been conceived in response to the foregoing background art, and has been made in an effort to provide a method of detecting a target object from an image by using a neural network.

In order to solve the foregoing object, an exemplary embodiment of the present disclosure discloses a method of detecting a target object performed by a computing device including at least one processor, the method including: receiving an input image; and generating first result information related to an area corresponding to a target object from the input image based on a trained neural network-based detection model.

In an alternative exemplary embodiment, the detection model may be trained based on a training data set including at least one training image and Ground Truth (GT) data corresponding to each training image, and the GT data may include a plurality of channels.

In the alternative exemplary embodiment, the training data set according to the present disclosure is generated based on an incremental operation that generates a plurality of new training image-GT data pairs from at least one existing training-image-GT data pair, and is generated before being input to the detection model for training the neural network-based detection model.

In the alternative exemplary embodiment, the GT data may include a first channel including contour information about the target object.

In the alternative exemplary embodiment, the GT data may include a second channel including adjacent area information about an area adjacent between two different target objects.

In the alternative exemplary embodiment, the GT data may include: a first channel including contour information about the target object; a second channel including adjacent area information about an area adjacent between two different target objects; and a third channel including target area information.

In the alternative exemplary embodiment, the generating of the first result information may include generating single-channel output data based on multi-channel output data generated from the input image by the detection model.

In the alternative exemplary embodiment, the generating of the single-channel output data may include adjusting a value included in a third channel based on at least one of a first channel and a second channel of the multi-channel output data, and the multi-channel output data may include: a first channel including contour information about the target object; a second channel including adjacent area information about an area adjacent between two different target objects; and a third channel including target area information.

In the alternative exemplary embodiment, the adjusting may include: changing at least a part of values allocated to an area corresponding to a contour determined based on the first channel to a background value in the third channel; and changing at least a part of values allocated to an area corresponding to an adjacent area determined based on the second channel to a background value in the third channel.

In the alternative exemplary embodiment, the method of detecting the target object according to the present disclosure may further include: generating a first polarized image by performing a first decomposition operation on the input image; and generating a synthesized image through an image generating model based on the input image. Further, the generating of the first result information may include generating the first result information related to the area corresponding to the target object from the input image additionally based on the first polarized image and the synthesized image.

In the alternative exemplary embodiment, the method of detecting the target object according to the present disclosure may further include generating second result information related to an individual area of each of the two or more target objects that do not overlap each other within the input image based on the first result information.

In the alternative exemplary embodiment, the method of detecting the target object according to the present disclosure may further include calculating individual contour information about each of the two or more target objects based on the second result information.

In order to solve the foregoing object, another exemplary embodiment of the present disclosure discloses a computer program stored in a computer readable storage medium. When the computer program is executed by one or more processors, the computer program causes following operations for detecting a target object to be performed, the operations including: receiving an input image; and generating first result information related to an area corresponding to a target object from the input image based on a trained neural network-based detection model.

In order to solve the foregoing object, another exemplary embodiment of the present disclosure discloses an apparatus for detecting a target object. The apparatus may include: one or more processors; one or more memories; and a network unit, in which the one or more processors receive an input image, and generate first result information related to an area corresponding to a target object from the input image based on a trained neural network-based detection model.

According to the present disclosure, it is possible to provide a method of detecting a target object.

DETAILED DESCRIPTION

Figure 1:
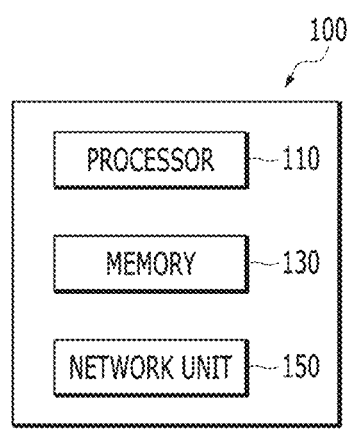
FIG. 1 is a block diagram of a computing device for detecting a target object according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used m the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify inter-changeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

FIG. 1 is a block diagram of a computing device for detecting a target object according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. The processor 110 may generate first result information related to an area corresponding to a target object from an input image based on a trained neural network-based detecting model.

In the present disclosure, terms, such as "first" and "second", are used to distinguish one component from other components, and are only used to maintain consistency of the referent throughout the specification, and should not limit the scope of rights. Accordingly, if necessary, "first" may be changed to and named as "second" and "second" may be changed to and named as "first" throughout the specification.

In the present disclosure, an "input image" may include an image generated by an SAR radar system or an RGB image. The processor 110 may input an input image to the detection model and generate result information related to an area corresponding to a target object from the input image as a computation result by the detection model.

In the present disclosure, the result information may include information related to the target object existing in the input image. For example, the result information may include a classification result value of whether the target object is present in at least a part of the input image. When the target object is one, the classification result value included in the result information may be a binary classification value. When the target object is plural, the classification result value included in the result information may be a multi-class classification value. For another example, the result information may include a coordinate value of the target object present in the input image. When there are two or more target objects in the input image, the result information may include two or more target object coordinate values. The coordinate value of the target object may be, for example, a coordinate value of a center point of the target object, coordinate values of four vertices of a rectangular box including the target object, a coordinate value of each vertex of a polygonal box including the target object, and the like. The example related to the above-described coordinate values is only an example for description and does not limit the present disclosure. For another example, the result information may be a classification value for each pixel of the input image. The result information may be a classification value for each pixel for obtaining at least one pixel corresponding to the target object among the plurality of pixels included in the input image. In the present disclosure, the result information may also be a value obtained as a result of the segmentation performed by the processor 110 for detecting a pixel corresponding to the target object among the plurality of pixels included in the input image. The processor 110 may generate result information by assigning the classification value for each of at least a part of the plurality of pixels included in the input image. For an example, the processor 110 may allocate a value of "0" to the pixels that do not correspond to the target object among the plurality of pixels included in the input image and may allocate a value of "1" to the pixels corresponding to the target object. When the number of target objects to be detected is plural, the processor 110 may also assign different values to the pixels corresponding to different target objects in order to discriminate the plurality of target objects. In the present disclosure, the first result information may be the result information generated based on the result of the semantic segmentation performed on the input image by the processor 110. In the present disclosure, the second result information may be the result information generated based on the result of the instance segmentation performed on the input image by the processor 110.

The processor 110 may directly perform an operation for training the neural network-based detection model. The processor 110 may read a parameter of the neural network-based detection model that is already trained and stored in the memory 130 from the memory 130 and then generate first result information for the input image based on the detection model. The processor 110 may generate single-channel output data based on the multi-channel output data generated by the detection model for the input image based on the detection model in order to generate the first result information. The processor 110 may adjust a value included in a third channel based on a first channel and a second channel of the multi-channel output data generated by the detection model. The processor 110 may change at least a part of the values allocated to an area corresponding to a contour determined based on the first channel as a background value in the third channel of the multi-channel output data. The processor 110 may change at least a part of the values allocated to an area corresponding to an adjacent area determined based on the second channel as a background value in the third channel of the multi-channel output data. The processor 110 may generate a first polarized image by performing a first decomposition operation on the input image. The processor 110 may generate a synthetized image through an image generating model based on the input image. The processor 110 may generate the first result information related to the area corresponding to the target object in the input image based on the detection model and additionally based on the first polarized image and the synthesized image. The processor 110 may generate the second result information related to an individual area of each of the two or more target objects that do not overlap each other in the input image based on the first result information. The processor 110 may extract individual contour information for each of the two or more target objects that do not overlap each other based on the second result information.

According to the exemplary embodiment of the present disclosure, the processor 110 may perform computation for training a neural network. The processor 110 may perform a calculation, such as processing of input data for training in Deep Learning (DN), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

According to the exemplary embodiment of the present disclosure, the memory 130 may store a predetermined type of information generated or determined by the processor 110 and a predetermined type of information received by a network unit 150. The memory 130 may store at least one of the parameters included in the neural network-based detection model and/or the image generating model. The memory 130 may store at least a part of the parameter values of the neural network-based detection model received by the network unit 150. The memory 130 may store at least a part of the parameter values of the image generating model received by the network unit 150.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

In the present disclosure, the network unit 150 may use various communication systems regardless of its communication mode, such as wired and wireless. The network unit 150 may receive the input image from an external device or an external server by using wired and wireless communication systems and the like. The network unit 150 may receive at least a part of the parameter values of the trained model from an external device or an external server by using wired and wireless communication systems and the like.

Although not illustrated in FIG. 1, the computing device 100 according to the present disclosure may include an input unit for receiving the input image as an additional configuration. The computing device 100 may receive the input image that is the target for detecting the target object from a user through the input unit.

Figure 2:
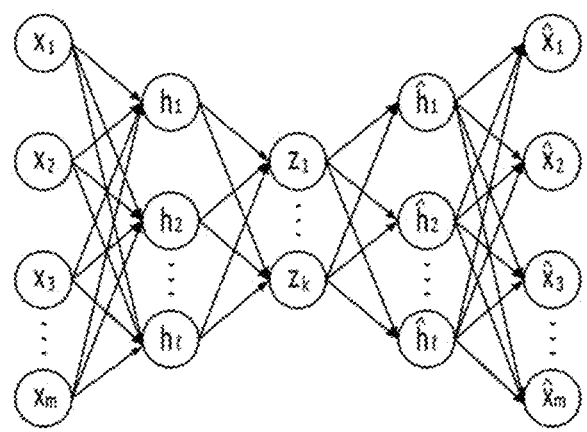
FIG. 2 is a schematic diagram illustrating a network function according to the exemplary embodiment of the present disclosure.

FIG. 2 is a schematic diagram illustrating a network function according to the exemplary embodiment of the present disclosure. At least a part of the detection model or the image generating model according to the present disclosure may be based on a network function which is to be described below.

Throughout the present specification, a model, a nerve network, an artificial neural network, the network function, and the neural network may be used with the same meaning. The neural network may be formed of a set of interconnected calculation units which are generally referred to as "nodes". The "nodes" may also be called "neurons". The neural network consists of at least one node. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

The neural network according to the exemplary embodiment of the present disclosure may include a plurality of neural network layers. The plurality of neural network layers may configure a sequence having a predetermined order in the neural network according to their functions and roles. The plurality of neural network layers may include a convolutional layer, a pooling layer, a fully connected layer, and the like. The first input for the neural network may be received by the first layer that is the lowest in the sequence. The neural network may sequentially input the first input to the layers in the sequence in order to generate the final output from the first input. The first input may be, for example, an image, and the final output for the first input may be, for example, a score for each category in a category set including one or more categories.

The neural network layer according to the exemplary embodiment of the present disclosure may include at least one node. A weight or a bias may be allocated to each node included in the neural network layer. The memory 130 of the computing device 100 according to the present disclosure may store a weight or a bias allocated to at least one node included in the neural network layer. Each neural network layer may receive the first input for the convolution neural network or an output of a just previous neural network layer as an input. For example, in the sequence consisting of the plurality of neural network layers, the $N^{th}$ neural network layer may receive an output of the $N-1^{th}$ neural network layer as an input. Each neural network layer may generate an output from the input. In the case where the neural network layer is the final neural network layer having the highest sequence, the output of the neural network layer may be treated as an output of the entire neural network.

In the present disclosure, a term "feature map" may be used as a term referring to at least a part of the result values of the convolution operation. The neural network layer may include one or more filters for the convolution operation. The feature map may be used as a term referring to a result of performing the convolution operation by using one filter among the one or more filters included in the neural network layer. A size of an output dimension of the neural network layer may be the same as the number of filters included in the neural network layer.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network Siamese network, and the like. The foregoing description of the deep neural network is merely illustrative, and the present disclosure is not limited thereto.

In the exemplary embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of the nodes of the network during the learning process, a method using a bath normalization layer, and the like may be applied.

In the present disclosure, the detection model may be trained based on a training data set including at least one training image and Ground Truth data (GT) corresponding to each training image. The detection model may receive the training image and generate an output value for the training image. The detection model may be trained based on a difference between the output value for the training image and a value of the GT data corresponding to the training image. The GT data according to the present disclosure may include at least one channel or a plurality of channels. The plurality of channels may be indicated separately from each other through the expressions "first" and "second". However, as described above, in the present disclosure, terms, such as "first" and "second", are used only to distinguish the referent throughout the specification and to maintain the consistency of the referent, and the scope of rights should not be limited by these terms. In the present disclosure, the "channel" may be used as a meaning of a "data set including a value allocated to at least one pixel included in the image". For example, in the case where the GT data include a plurality of channels for the color of the image, the GT data may include a red channel, a green channel, and a blue channel. In this case, the red channel may include a value for determining the degree of red color allocated to each pixel included in the image. Similar to the red channel, the green channel and the blue channel may include values for determining the degrees of green color and blue color allocated to each pixel included in the image. The example of the above-described RGB channels is only an exemplary description for describing the GT data consisting of the plurality of channels, and the present disclosure includes the configuration of a plurality of channels used to represent different information for each pixel included in the image without limitation.

The training data set according to the present disclosure may be generated based on an incremental operation that generates a plurality of new training image-GT data pairs from at least one existing training-image-GT data pair, and may be generated before being input to the detection model for training the neural network-based detection model. The incremental operation that generates the plurality of new training image-GT data pairs from the existing training-image-GT data pair may include, for example, a flip operation that flips the image up and down, left and right, a rotation operation that rotates the image in units of 90 degrees, and a noise injection operation. The training data set according to the present disclosure may mean before the entire process for training the detection model. The general data augmentation operation is performed according to the number of all cases immediately before the input of the training data to the neural network-based model through a series of computational processes on the training data, or randomly performed immediately before the input of the training data to the neural network-based model after a series of computational processes on the training data. However, when the training data is augmented according to the number of all cases immediately before the input of the training data to the neural network-based model after the operation process on the training data starts by the computing device, memory shortage appears depending on the batch size (that is, the number of data for training at one time) or data size, or too much computing resources are consumed for data operation, resulting in a bottleneck phenomenon. Also, random augmentation of data may cause a problem in that the training data is probabilistically biased to a specific type of data. However, when the training data set is generated before the training of the detection model starts and is stored in the memory 130 according to the present disclosure, the training data may be generated according to the number of all cases, and there is an effect in that it is possible to solve a memory resource limitation problem and a bottleneck phenomenon.

In the exemplary embodiment of the present disclosure, the GT data may include the first channel including the contour information of the target object. In the first channel, a pixel value allocated to an area corresponding to the contour of the target object may be different from pixel values allocated to other areas. For example, "1" may be allocated to the pixel value for the area corresponding to the contour of the target object, and "0" may be allocated to the pixel value for the area that does not correspond to the contour of the target object. In the first exemplary embodiment for determining the contour information of the target object according to the present disclosure, the area corresponding to the contour of the target object may be determined based on the pixels in which at least one side (that is, one side among four sides of a quadrangular pixel) of the pixels determined to correspond to the target object within the training image is in contact with an external pixel (that is, the pixel determined not to correspond to the target object). A thickness of the area corresponding to the contour of the target object determined according to the first exemplary embodiment may be 1 by selecting the pixels, in which at least one side is in contact with the external pixel, among the pixels. In the present disclosure, the thickness of the contour may be determined as the minimum number of pixels through which a virtual line connecting a center point of at least one pixel of an inner space and a center point of at least one pixel of an outer space passes when there are the inner space and the outer space separated by the contour of the target object.

According to the present disclosure, in a second exemplary embodiment for determining contour information of the target object, the area corresponding to the contour of the target object may also be determined based on external pixels in which at least one side is in contact with the pixels determined to correspond to the target object in the training image. The area corresponding to the contour of the target object determined according to the second exemplary embodiment may be determined by selecting external pixels in which at least one side is in contact with the pixels determined to correspond to the target object among the pixels present in the training image. In this case, a thickness of the pixel may be 1.

According to the present disclosure, in a third exemplary embodiment for determining contour information of the target object, the area corresponding to the contour of the target object may be based on the contour area by the first exemplary embodiment or the contour area by the second exemplary embodiment, and may have a larger thickness. The area corresponding to the contour of the target object according to the third exemplary embodiment may be determined by selecting the pixels corresponding to the contour of the target object based on the first exemplary embodiment or the second exemplary embodiment and additionally selecting some of the pixels in which at least one side is in contact with the selected pixels again, and a thickness of the area may be 2. When expanded in the same way, the area corresponding to the contour of the target object may also have a thickness of N pixels (N is a natural number equal to or larger than 1). When the contour information of the target object is determined according to the third exemplary embodiment, the area may include a contour thicker than those of the first exemplary embodiment and the second exemplary embodiment. When the neural network-based detection model is trained based on the first channel including the contour information of the target object having the thick pixel, the detection model may be trained by using training data in which the contour of the target object is emphasized.

The foregoing first to third exemplary embodiments for determining the contour information of the target object merely correspond to the examples for description, and do not limit the present disclosure. The neural network-based detection model according to the present disclosure is trained based on the GT data including the first channel including the contour information of the target object, so that the neural network-based detection model may intensively learn and detect the contour area of the target object from the input image for inference. The training data and training method has the advantage of being able to generate the detection model which accurately determines a boundary between the target object and a background compared to the detection model trained based on single data simply representing the entirety of the area corresponding to the target object.

Figure 3A:
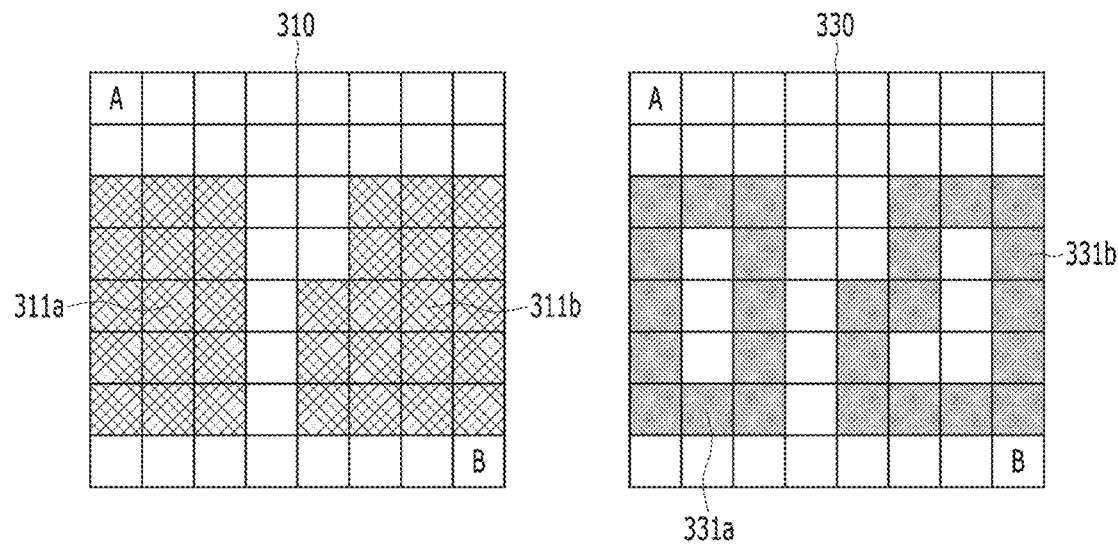
FIG. 3A is a diagram illustrating an example of a first channel included in Ground Truth (GT) data according to the exemplary embodiment of the present disclosure.

FIG. 3A is a diagram illustrating an example of the first channel included in the GT data according to the exemplary embodiment of the present disclosure. The first channel 330 of the GT data may include contour information of a target object. As illustrated in FIG. 3A, the first channel 330 of the GT data may have the same horizontal and vertical pixel sizes as those of a training image 310. The first channel 330 of the GT data may be a data set including a value allocated to at least one pixel. The first channel 330 of the GT data may have a different value for each pixel. In FIG. 3A, the expression of some pixels with a different color from that of the rest is to visually express that different values are allocated to the pixels, respectively. For example, the pixels displayed darker than other portions among the plurality of pixels included in the first channel 330 of the GT data may be the pixels corresponding to the contour of the target object included in the training image 310. Reference numerals 311a and 311b indicate the plurality of target objects included in the training image 310, respectively. The pixels corresponding to the contour of the target object included in the first channel 330 of the GT data may have the same value. For example, in the first channel 330 of the GT data, a pixel value of an area 331a corresponding to a contour of a first target object 311a and a pixel value of an area 331b corresponding to a contour of a second target object 311b may have the same value.

In the exemplary embodiment of the present disclosure, the GT data may include a second channel including adjacent area information about an area adjacent between two different target objects. The "area adjacent between two different target objects" according to the present disclosure may mean a space between two contours that are close to each other by a predetermined threshold distance or less when a distance between the contours of the two different target objects is equal to or smaller than the predetermined threshold distance. Herein, the distance between the contours of the two different target objects may be calculated by a distance from one pixel on the contour of the first target object to the closest pixel among the pixels on the contour of the second target object. The predetermined threshold distance may be set to a natural number or a positive real number. Hereinafter, a particular example of the second channel will be described with reference to FIG. 3B.

Figure 3B:
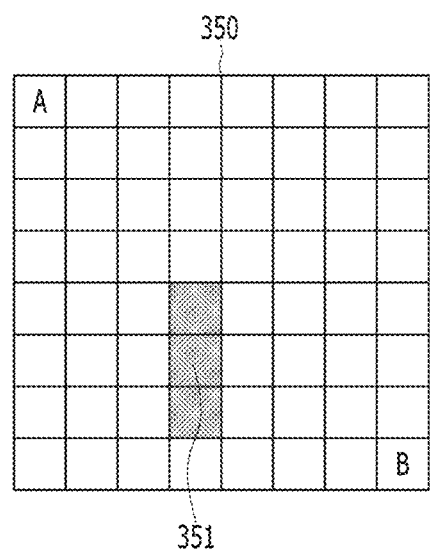
FIG. 3B is a diagram illustrating an example of a second channel included in GT data according to the exemplary embodiment of the present disclosure.

FIG. 3B is a diagram illustrating an example of a second channel included in GT data according to the exemplary embodiment of the present disclosure. A second channel 350 of GT data may include adjacent area information about an area adjacent between two different target objects included in the training image 310 of FIG. 3A. In FIG. 3B, the expression of some pixels with a different color from that of the rest is to visually express that different values are allocated to the pixels, respectively. For example, the pixels displayed darker than other portions among the plurality of pixels included in the second channel 350 of the GT data may be the pixels corresponding to the area adjacent between the two different target objects included in the training image 310. The adjacent area 351 between the two different target objects expressed in the second channel 350 of the GT data may be the area in which a distance between a contour of the first target object 311a and a contour of the second target object 311b included in the training image 310 is equal to or smaller than a predetermined threshold distance. For the particular description, it is assumed that a coordinate of pixel A in the training image 310 is (1,8) and a coordinate of pixel B in the training image 310 is (8,1). Then, it is assumed that the predetermined threshold distance is 2. Under the assumption, a pixel on the contour of the second target object 311b closest to one pixel (3,4) on the contour of the first target object 311a is (5,4). In this case, a distance between the two pixels is 2, which corresponds to the predetermined threshold distance of 2 or less. Therefore, the pixel at the point (4,4) corresponding to the space between the two pixels may be determined as the adjacent area. As a result, the pixel at the point (4,4) among the pixels of the second channel 350 of the GT data representing the adjacent area 351 between the two different target objects included in the training image 310 may be determined as the adjacent area. The above example described with reference to FIG. 3B is only the example for explaining the generation principle of the second channel and does not limit the present disclosure.

When the neural network-based detection model is trained with the second channel including the adjacent area information about the area adjacent between the two different target objects according to the present disclosure as a part of the GT data, decomposition performance of the trained detection model is improved. That is, in a training environment where there is a risk of being recognized the plurality of target objects within the image as one target object due to the close presence of the plurality of target objects, it is possible to accurately recognize the adjacent area between the target object and separate different target objects by using the second channel according to the present disclosure in the training process of the detection model. This has the advantage of obtaining a trained neural network-based detection model with higher resolution than a detection model trained by other methods.

In the exemplary embodiment of the present disclosure, the GT data may include the third channel including target object information. The third channel may have a size corresponding to the training image. Hereinafter, the third channel will be described in detail with reference to FIG. 3C.

Figure 3C:
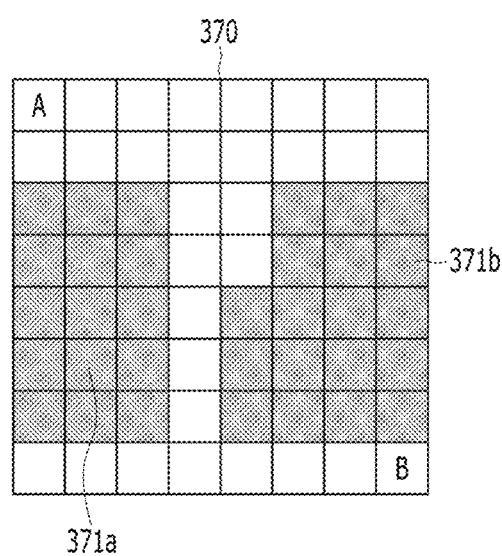
FIG. 3C is a diagram illustrating an example of a third channel included in GT data according to the exemplary embodiment of the present disclosure.

FIG. 3C is a diagram illustrating an example of a third channel included in GT data according to the exemplary embodiment of the present disclosure. Reference numeral 371a of a third channel 370 of the GT data may be a target area corresponding to the first target object 311a included in the training image 310 of FIG. 3A. Reference numeral 371b of the third channel 370 of the GT data may be a target area corresponding to the second target object 311b included in the training image 310 of FIG. 3A. The pixels corresponding to the target areas 371a and 371b among the plurality of pixels included in the third channel 370 of the GT data may have different values from those of the remaining pixels. When the neural network-based detection model is trained with the third channel according to the present disclosure as a part of the GT data, the detection model may be supervised and trained based on an operation of comparing output data for the input image input in the inference process with correct answer data.

The detection model according to the present disclosure may be trained based on the GT data including the plurality of channels. In particular, the detection model may be trained by the GT data including at least one channel between the first channel including the contour information of the target object and the second channel including the adjacent area information about the area adjacent between the two different target objects and additionally including the third channel including the target area information. When the neural network-based detection model is trained by the foregoing GT data, the detection model may be trained to accurately detect the target object compared to the case where the detection model is trained by the GT data including only one channel. For example, when the detection model is trained by the first channel including the contour information of the target object and the third channel including the target area information, the detection model may more accurately determine a contour of the target object and properly detect a shape of the target object. For another example, when the detection model is trained by the second channel including the adjacent area information about the area adjacent between the two different target objects and the third channel including the target area information, the detection model may accurately separate even the target objects which are close to each other. For another example, when the detection model is trained by all of the first channel, the second channel, and the third channel, the detection model may accurately determine the contour of each target object and accurately separate the target objects which are close to each other.

According to the exemplary embodiment of the present disclosure, an operation of generating, by the processor 110, the first result information related to the area corresponding to the target object in the input image may include an operation of generating, by the processor 110, single-channel output data based on the multi-channel output data generated from the input image by the detection model. The processor 110 may generate multi-channel output data for the input image by using the detection model trained based on the GT Data including the plurality of channels. For example, when the detection model is trained based on the GT data including at least two or more channels among the first channel including the contour information of the target object, the second channel including the adjacent area information about the area adjacent between the two different target objects, and the third channel including the target area information, the multi-channel output data generated by the processor 110 through the detection model may include at least two or more channels among the first channel including the contour information of the target object, the second channel including the adjacent area information about the area adjacent between the two different target objects, and the third channel including the target area information. In the present disclosure, the first channel to the third channel may be used in both the GT data used for training the detection model and the output data generated by the inference of the detection model regardless of the type of data. The first channel to the third channel of the multi-channel output data generated by the detection model correspond to the first channel to the third channel of the GT data for training the detection model, and each of the first to third channels may be described similarly to the corresponding channel included in the GT data, so that the overlapping content will be omitted and differences will be described below.

Each channel included in the GT data according to the present disclosure and each channel included in the multi-channel output data generated by the detection model are defined similarly, but there may be differences in the accuracy or reliability of the values. For example, the GT data is the training data for training the neural network-based detection model, and may have accuracy of 100% in order to provide a criterion for the training result. The multi-channel output data is the data generated for a new input image by the detection model trained based on the GT data, so that the accuracy of the multi-channel output data may be the same as or less than the accuracy of the GT data. The GT data may be generated by a user and then input through the input unit of the computing device 100. The GT data may also be generated from the outside and then stored in the memory 130 through the network unit 150 of the computing device 100. The multi-channel output data may be generated by the processor 110 according to the present disclosure.

As described above, the detection model trained by the GT data including the plurality of channels may generate the multi-channel output data including the plurality of channels similarly, and hereinafter, a method of generating single-channel output data from the multi-channel output data will be described. The processor 110 may generate first result information related to the target object from the generated single-channel output data.

According to the exemplary embodiment of the present disclosure, the processor 110 may adjust a value included in the third channel of the multi-channel output data based on at least one channel between the first channel and the second channel of the multi-channel output data generated by the trained detection model. The processor 110 may generate single-channel output data based on the third channel in which the value is adjusted. This will be described in detail with reference to FIG. 4.

Figure 4:
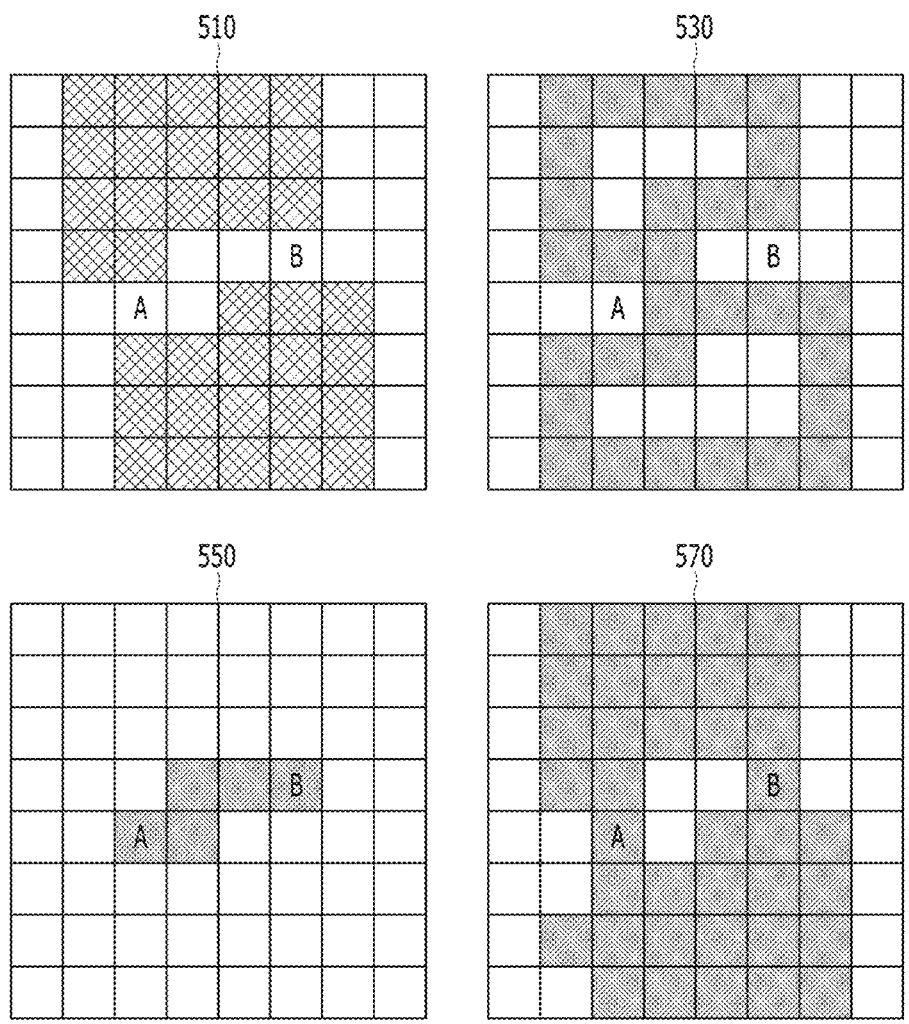
FIG. 4 is a diagram illustrating an example of multi-channel output data generated based on a detecting model according to the exemplary embodiment of the present disclosure.

FIG. 4 is a diagram illustrating an example of multi-channel output data generated based on a detecting model according to the exemplary embodiment of the present disclosure. Reference numeral 510 indicates an input image received by the computing device 100. The pixels displayed dark in the input image 510 may be interpreted as indicating areas in which the target object is present. A first channel 530 of the multi-channel output data may include contour information of the target object included in the input image 510. A second channel 550 of the multi-channel output data may include adjacent area information about an area adjacent between two different target objects included in the input image 510. The third channel 570 of the multi-channel output data may include target area information included in the input image 510.

In the exemplary embodiment of the present disclosure, the processor 110 may change a value of a pixel corresponding to an outer area based on the contour of the target object in the third channel 570 of the multi-channel output data as a background value in order to generate single-channel output data. The contour of the target object may be determined based on the first channel 530 of the multi-channel output data. In the present disclosure, the background value is a value to be allocated to a pixel of an area, not the target object, and means a predetermined real number. For example, the background value may be set to "0".

In another exemplary embodiment of the present disclosure, the processor 110 may change the value of the pixel corresponding to the area adjacent between the two different target objects in the third channel 570 of the multi-channel output data to a background value in order to generate single-channel output data. The adjacent area between the two different target objects may be determined based on the second channel 550 of the multi-channel output data.

The processor 110 may also change a value of at least a part of the multi-channel output data in the third channel 570 based on both the first channel 530 of the multi-channel output data and the second channel 550 of the multi-channel output data in order to generate single-channel output data. The processor 110 may change at least a part of the values of the pixels corresponding to the contour of the target object in the third channel 570 of the multi-channel output data to a background value. The contour of the target object may be determined based on the first channel 530 of the multi-channel output data. Continuously, the processor 110 may change at least a part of the values of the pixels corresponding to the area adjacent between the two different target objects in the third channel 570 of the multi-channel output data to a background value. Whether the area corresponds to the area adjacent between the two different target objects may be determined based on the second channel 550 of the multi-channel output data. As described above, when the adjustment of the value for the third channel 570 of the multi-channel output data is completed, the processor 110 may generate the third channel of which the adjustment is completed, as single-channel output data. Hereinafter, this will be described in detail with reference to FIG. 5.

Figure 5:
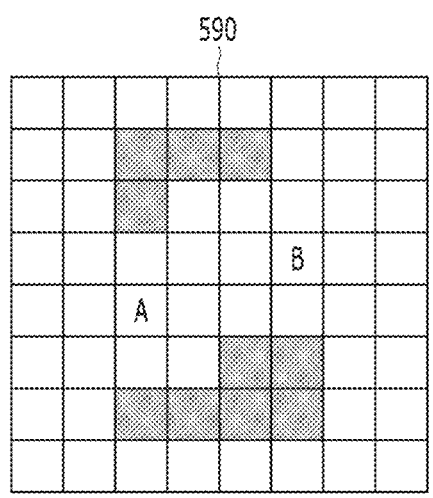
FIG. 5 is a diagram illustrating an example of single-channel output data generated from multi-channel output data according to the exemplary embodiment of the present disclosure.

FIG. 5 is a diagram illustrating an example of single-channel output data generated from multi-channel output data according to the exemplary embodiment of the present disclosure. The plurality of pixels included in the single-channel output data 590 may have different values. In FIG. 5, the pixels filled with different patterns mean that different values have been allocated to the pixels. The single-channel output data 590 of FIG. 5 may be the single channel output data generated from each channel of the multi-channel output data illustrated in FIG. 4. In particular, the processor 110 may change the values of the pixels corresponding to the contour of the target object that may be determined based on the first channel 530 of the multi-channel output data to background values in the third channel 570 of the multi-channel output data. The background value is a value for indicating the pixels that do not correspond to the target object, and may be predetermined with a predetermined value, and may be predetermined to, for example, "0". In the continuous exemplary embodiment, the processor 110 may change the values of the pixels corresponding to the area adjacent between the two different target objects in the third channel 570 of the multi-channel output data to the background values. The area adjacent between the two different target objects may be determined based on the second channel 550 of the multi-channel output data. As described above, the processor 110 may generate the single-channel output data 590 through the process described with reference to FIG. 5.

When two or more target objects are present in the input image, in the case of the present disclosure, performance of separating and detecting the target objects by using the neural network-based detection model may be improved. Each of the channels included in the multi-channel output data of FIG. 4 will be described again. The first channel 530 of the multi-channel output data is the channel for determining the contour of the input image 510. However, due to various causes, such as the quality of the input image, the limitation of computing resources, and the progress rate of learning, there is a possibility that the contour by the first channel 530 of the multi-channel output data has slightly lower accuracy. The third channel 570 of the multi-channel output data is also the channel for indicating the pixels corresponding to the target object, but due to the foregoing various causes, the accuracy thereof may slightly low as illustrated in FIG. 4. When the target object is detected by using only the first channel 530 of the multi-channel output data or the target object is detected by using only the third channel 570 of the multi-channel output data illustrated in FIG. 4, the boundary is ambiguous, so that the computing device may recognize the target objects as one. This is different from actual information transmitted by the input image 510. However, when the area corresponding to the target object according to the method of generating the single-channel output data according to the exemplary embodiment of the present disclosure is detected, there is the advantage of accurately separating and detecting the plurality of target objects as exemplified in FIG. 5.

Hereinafter, in the case where the input image is a "Radio Detection And Ranging (RADAR) image", an input image pre-processing method for more accurately detecting a target object will be described. The RADAR image means an image generated based on a RADAR signal Hereinafter, in order to represent the case where the input image is generated based on the RADAR signal, an "input RADAR image" and an "input image" may be used interchangeably. In general, a RADAR includes a transmitter configuration and a receiver configuration, and has the main functions of detecting a position or a direction of an object and measuring a distance or a speed of an object. Among them, the measurements of the distance and the speed of the target object are based on the measurement of the propagation speed and the propagation time required of the radio wave, and the frequency shift due to the Doppler effect included in the reflected or scattered radio wave, respectively. In the present disclosure, the image generated based on the RADAR signal means an image generated based on information about a received radio wave signal when a RADAR transmitter transmits a radio wave signal and then a RADAR receiver receives a radio wave signal reflected from the target object. The information of the radio wave signal may include, for example, a direction, magnitude, frequency, and scattering degree of the radio wave. The RADAR image according to the present disclosure may be an input RADAR Synthetic Aperture Radar (SAR) image. The SAR is a type of RADAR that generates a ground topographic map by sequentially transmitting pulse waves to the ground or sea and sequentially synthesizing pulse waves that are reflected from curved surfaces on the ground or the sea in a first-come-first-served basis according to a minute time difference, and the SAR image refers to an RADAR image generated by the SAR.

The processor 110 according to the present disclosure may generate a first polarized image by performing a first decomposition operation on the input RADAR image.

The decomposition operation in the present disclosure may include an operation of generating an RGB image having an RGB value for each pixel from the input RADAR image including the RADAR signal value for each pixel. The RADAR signal value for each pixel may include values according to a plurality of types. In the present disclosure, the "RADAR signal value" may be used interchangeably with "scattering data". The RADAR signal value for each pixel may include a VV value, an HH value, a VH value, and an HV value. V is an abbreviation for vertical and H is an abbreviation for horizontal, and each of V and H means a direction of an electric field within a radio wave. That is, the VV value means a value of a vertically transmitted and vertically received pulse wave. The HH value means a value of a horizontally transmitted and horizontally received pulse wave. Similarly, the VH value means a value of a vertically transmitted and horizontally received pulse wave.

In the present disclosure, the decomposition operation may include a plurality of decomposition operations that are distinguished from each other according to a method of the operation or a type of a value to be calculated. In the present disclosure, the decomposition operation may be a term used to generically refer to a plurality of decomposition operations. In the present disclosure, the decomposition operation may include, for example, Pauli decomposition. Sinclair decomposition and Cameron decomposition. The example of the decomposition operation is merely an example, and the decomposition operation includes various decomposition methods without limitations.

In the present disclosure, the decomposition operation may include an operation of decomposing scattering data for at least one pixel included in the input RADAR image. The scattering data may be expressed, for example, as a matrix, in Equation 1.

$$S = \begin{bmatrix} S_{HH} & S_{HV} \\ S_{VH} & S_{VV} \end{bmatrix}$$ [Equation 1]

In Equation 1, S represents a scattering data matrix for predetermined one pixel. $S_{XY}$ represents a value when X-direction polarized light is transmitted and Y-direction polarized light is received.

According to the exemplary embodiment of the present disclosure, the polarized image generated by the processor 110 based on the decomposition operation may be an optical image. The polarized image may be an RGB image. The RGB image may have an RGB value for each pixel. A color of each pixel may be determined according to a combination of values corresponding to red, green, and blue. For example, the pixel having the RGB value of (255, 0, 0) may be determined as red. For another example, the pixel having the RGB value of (238, 130, 238) may be determined as purple. The example of the RGB value is merely an example, and does not limit the present disclosure.

In the first exemplary embodiment of the decomposition operation for creating the polarized image according to the present disclosure, for each of the plurality of pixels included in the input RADAR image, the processor 110 may determine an RGB value. The processor 110 may calculate a value of $S_{HH}^2$ from the scattering data of the pixel and determine a red value of the corresponding pixel. The processor 110 may calculate a value of $S_{VV}^2$ from the scattering data of the pixel and determine a green value of the corresponding pixel. The processor 110 may calculate a value of $2 \times S_{HV}^2$ from the scattering data of the pixel and determine a blue value of the corresponding pixel. The processor 110 may determine an RGB value of the pixel on the polarized image corresponding to the position of each pixel of the input RADAR image according to the first exemplary embodiment.

In the second exemplary embodiment of the decomposition operation for creating the polarized image according to the present disclosure, for each of the plurality of pixels included in the input RADAR image, the processor 110 may determine an RGB value. The processor 110 may calculate a value of $S_{HH}-S_{VV}$ from the scattering data of the pixel and determine a red value of the corresponding pixel. The processor 110 may calculate a value of $S_{HV}$ from the scattering data of the pixel and determine a green value of the corresponding pixel. The processor 110 may calculate a value of $S_{HH}+S_{VV}$ from the scattering data of the pixel and determine a blue value of the corresponding pixel. The processor 110 may determine an RGB value of the pixel on the polarized image corresponding to the position of each pixel of the input RADAR image according to the second exemplary embodiment.

In the third exemplary embodiment of the decomposition operation for creating the polarized image according to the present disclosure, for each of the plurality of pixels included in the input RADAR image, the processor 110 may determine an RGB value. The processor 110 may calculate a value of $S_{VV}$ from the scattering data of the pixel and determine a red value of the corresponding pixel. The processor 110 may calculate a value of $S_{VH}$ from the scattering data of the pixel and determine a green value of the corresponding pixel. The processor 110 may calculate a value of $S_{VV}/S_{VH}$ from the scattering data of the pixel and determine a blue value of the corresponding pixel. The processor 110 may determine an RGB value of the pixel on the polarized image corresponding to the position of each pixel of the input RADAR image according to the third exemplary embodiment. When the processor 110 generates the polarized image from the input RADAR image according to the third exemplary embodiment, the computing device 100 according to the present disclosure may generate the polarized image even for the input RADAR image having only two types of RADAR signal values for each pixel.

In the fourth exemplary embodiment of the decomposition operation for creating the polarized image according to the present disclosure, for each of the plurality of pixels included in the input RADAR image, the processor 110 may determine an RGB value based on Equations 2 to 4 below.

$$\alpha = \frac{S_{HH} + S_{VV}}{\sqrt{2}}$$ [Equation 2]

$$\beta = \frac{S_{HH} - S_{VV}}{\sqrt{2}} \quad \text{[Equation 3]}$$

$$\gamma = \sqrt{2}\, S_{HV} \quad \text{[Equation 4]}$$

α, β, and γ expressed in Equations 2 to 4 are real number values. α, β, and γ may be calculated by the processor 110 according to the corresponding Equation among Equations 2 to 4 from the scattering data for each pixel. The processor 110 may determine a red value of the corresponding pixel by squaring the value of α calculated according to Equation 2. The processor 110 may determine a green value of the corresponding pixel by squaring the value of γ calculated according to Equation 4. The processor 110 may determine a blue value of the corresponding pixel by squaring the value of β calculated according to Equation 3. The processor 110 may determine an RGB value of the pixel on the polarized image corresponding to the position of each pixel of the input RADAR image according to the fourth exemplary embodiment.

As described above, the first to fourth exemplary embodiments in which the processor 110 performs the decomposition operation on the input RADAR image to generate a polarized image are merely various examples of generating a polarized image based on a decomposition operation using different methods, and do not limit the method of generating a polarized image according to the present disclosure. The processor 110 performs a predetermined decomposition operation on the input RADAR image, so that the present disclosure includes various method of determining a red value, a green value, and a blue value for each of at least one pixel on the polarized image without limitation.

In the exemplary embodiment of the present disclosure, the processor 110 may generate a synthesized image through the image generating model based on the input RADAR image. The image generating model is the model based on the artificial neural network. Regarding the image generating model, contents overlapping with the contents described in FIG. 2 will be omitted, and differences will be mainly described.

In the exemplary embodiment of the present disclosure, the image generating model may be trained based on a Generative Adversarial Network (GAN) learning algorithm. The image generating model may be trained adversarially with a separate image determining model.

In the exemplary embodiment of the present disclosure, the training method of training the image generating model may include generating, by the image generating model, a synthesized image from a polarized image generated based on a RADAR image, and determining, by the image determining model, an actual optical image photographed through an optical sensor and a synthesized image generated by the image generating model. The image generating model and the image determining model may include at least one neural network layer. The image generating model may receive a polarized image generated based on the RADAR image and generate a synthesized image. In the present disclosure, the "actual optical image" may be used interchangeably with an "RGB image photographed by an optical lens". In the present disclosure, the "synthesized image" may be used interchangeably with an "image generated by the output of the image generating model". The processor 110 may generate the synthesized image so as to have a similar style to that of the actual optical image through the image generating model. The image generating model may be trained so as to discriminate well the output image generated by the image generating model and the actual optical image. In this case, the image generating model may be trained so that the image determining model cannot discriminate the synthesized image and the actual optical image. As described above, the image generating model and the image determining model may be adversarially trained with each other. The image determining model may calculate a confidence level for the input image, and then determine whether the image is the actual optical image by comparing a predetermined threshold value and the confidence level. In the training process, the image input to the image determining model may be the synthesized image and may also be the actual optical image. The particular additional description for the GAN learning algorithm for training the image generating model is discussed in more detail by "Jun-Yan Zhu, Taesung Park, Phillip Isola, Alexei A. Efros, 'Unpaired Image-to-Image Translation using Cycle-Consistent Adversarial Networks' arXiv:1703.10593, 2017" which is incorporated herein by reference in its entirety.

In the exemplary embodiment of the present disclosure, the generating of the synthesized image through the image generating model based on the input RADAR image by the processor 110 may include generating a synthesized image by inputting a first polarized image to the image generating model. The processor 110 may convert the input RADAR image into an RGB image for input data of the image generating model. The processor 110 may generate the first polarized image by performing a first decomposition operation on the input RADAR image in order to convert the input RADAR image into the RGB image. Then, the processor 110 may generate a synthesized image by inputting the generated first polarized image to the image generating model.

In the exemplary embodiment of the present disclosure, the generating of the synthesized image through the image generating model based on the input RADAR image by the processor 110 may include generating a second polarized image by performing a second decomposition operation on the input RADAR image and generating a synthesized image by inputting the second polarized image to the image generating model. In this case, the second decomposition operation may be based on an algorithm that is different from that of the first decomposition operation performed by the processor 110 for generating the first polarized image. For example, the first decomposition operation performed for generating the first polarized image by the processor 110 may be based on a value of VV and a value of HH among the RADAR signals included in the input RADAR image. In this case, the second decomposition operation performed for generating the second polarized image by the processor 110 may be based on a value of HH and a value of VH among the RADAR signals included in the input RADAR image. As such, the first decomposition operation and the second decomposition operation may be divided according to the type of signal value that is the target for the operation performance. For additional example, the first decomposition operation may be based on a Pauli decomposition, and the second decomposition operation may be based on a Cameron decomposition. As such the first decomposition operation and the second decomposition operation may also be divided according to the performance method of the operation. The examples of the first decomposition operation and the second decomposition operation are merely illustrative, and do not limit the present disclosure.

The processor 110 according to the present disclosure may generate first result information related to a target object in the input image based on the trained neural network-based detection model and additionally based on the first polarized image and the synthesized image.

As described above, the processor 110 may generate the synthesized image based on the second polarized image generated based on the different decomposition operation from that of the first polarized image. When the synthesized image is generated based on the second polarized image different from the first polarized image, there is an advantage in that the processor 110 is capable of generating the result information based on the data obtained by differently processing the input RADAR image. In particular, when the processor 110 generates result information by overlapping the first polarized image and the synthesized image generated based on the first polarized image, the additional operation for the second polarized image is not consumed, so that an operation speed may be increased, but the data is generated only based on the first polarized image, so that biased result information may be generated. However, when the processor 110 generates result information by overlapping the first polarized image and the synthesized image generated based on the second polarized image, the processor 110 interprets the input RADAR image through different polarized images generated in terms of different decomposition operations, so that there is an advantage in that it is possible to obtain accurate result information compared to the interpretation based on a single decomposition operation.

The processor 110 according to the present disclosure may generate the first result information by overlapping and inputting the first polarized image and the synthesized image to the detection model.

In the exemplary embodiment of the present disclosure, the processor 110 may overlap the first polarized image and the synthesized image by performing an addition operation or a subtraction operation on the RGB values of two pixels located at the same coordinates of the first polarized image and the synthesized image. In another exemplary embodiment, the processor 110 may overlap the first polarized image and the synthesized image by calculating an average value for the RGB values of two pixels located at the same coordinates of the first polarized image and the synthesized image. In another exemplary embodiment, the processor 110 may overlap the first polarized image and the synthesized image by performing a weighted sum operation on the RGB values of two pixels located at the same coordinates of the first polarized image and the synthesized image. The processor 110 may appropriately select a ratio of an RGB value of the first polarized image and an RGB value of the synthesized image in order to perform the weighted sum operation.

In the present disclosure, in the exemplary embodiment in which the first polarized image overlaps the synthesized image, the processor 110 may generate a combined image by sequentially combining the first polarized image and the synthesized image. The processor 110 may sequentially combine the two images in a channel axis direction of each image data. For example, when a horizontal length of the first polarized image is W, a vertical length is H, and the number of channels is C1, and a horizontal length of the synthesized image is W, a vertical length is H, and the number of channels is C2, the processor 110 may generate the combined image of which a horizontal length is W, a vertical length is H, and the number of channels is (C1+C2) by sequentially combining the first polarized image and the synthesized image in the channel direction. When the values of both C1 and C2 are 3 in order to express the RGB image, the processor 110 may generate the combined image having the channel size of 6 by sequentially combining the first polarized image and the synthesized image. As described above, when the processor 110 generates the combined image by sequentially combining the first polarized image and the synthesized image and then inputs the generated combined image to the detection model, there is an effect in that the detection model is capable of simultaneously receiving the polarized image in which a lot of basic information of the input RADAR image is preserved and the synthesized image in which a lot of auxiliary information about the contour or color of each object existing in the input RADAR image exists. That is, the detection model may calculate more accurate result information by independently receiving the information existing in each of the polarized image and the synthesized image without damage by the processor 110. Hereinafter, the effect in the case where the first result information is generated through the detection model based on the first polarized image and the synthesized image according to the present disclosure will be described with reference to FIG. 9.

Figure 9:
FIG. 9 is a diagram illustrating an example of a state of an image according to each operation of image processing.

FIG. 9 is a diagram illustrating an example of a state of an image according to each operation of image processing. An input RADAR image 903 may be illustrated to have different brightness for each pixel according to the size of the received RADAR signal. An original image 901 may be an image obtained by photographing a photographing target with an optical lens. The original image 901 may be illustrated to have different colors for each pixel according to a photographing result. The input RADAR image 903 illustrated in FIG. 9 represents the image in the case where an area corresponding to the original image 901 is photographed with RADAR equipment. A polarized image 905 may be an image generated as a result of the performance of a decomposition operation on the input RADAR image 903 by the processor 110. A synthesized image 907 may be an image generated through the image generating model based on the input RADAR image 903. The synthesized image 907 may be the image generated as a result of the input of the polarized image 905 to the image generating model. The synthesized image 907 may also be generated from the RGB image obtained as a result of the performance of the decomposition operation that is different from the decomposition operation for generating the polarized image 905 on the input RADAR image 903.

According to the present disclosure, the processor 110 may obtain more accurate result information about the input RADAR image 903 by overlapping and inputting the polarized image 905 and the synthesized image 907 to the detection model. First, each image characteristic is as follows. The simple polarized image 905 is obtained by performing the decomposition operation on the RADAR image, so that the areas having the size of the similar RADAR signal value within the input RADAR image 903 have the similar RGB values within the polarized image 905. However, since the RADAR signal value is a value distinguished according to a surface characteristic rather than an object, there is a problem in that a set of areas having similar RGB values in the polarized image 905 does not represent a specific object. For example, when the polarized image 905 of FIG. 9 is referred, the areas correspond to the same "building", but it can be seen that the RGB values of the areas are different. The cause of the problem may be in the method of generating the polarized image 905 in which the decomposition operation is performed on the RADAR signal value and a result of the specific calculation is allocated to red, green, and blue. Therefore, the processor 110 may not properly generate the meaningful result information from the input RADAR image 903 by using only the polarized image 905.

In the meantime, the different RGB value is assigned for each object in the synthesized image 907 generated through the image generating model, so that the discrimination or the detection of the object according to the RGB value in the synthesized image 907 may be easier than the polarized image 905. In particular, the synthesized image 907 has different RGB values for the building roof, road, tree, and the like, which makes it easier for the processor 110 to determine the boundary of an object or detect an object more easily compared to the polarized image 905. However, when the processor 110 generates the result information through the detection model by using only the synthesized image 907, information is deformed due to the additional processing on the input RADAR image 903, so that it may be impossible to generate accurate result information.

Therefore, the present disclosure discloses the method of generating more accurate result information about the input RADAR image 903 by overlapping, by the processor 110 of the present disclosure, the polarized image 905 in which the data of the input RADAR image 903 is well preserved, but noise is severe, and the synthesized image 907 which plays an auxiliary role in generating the result information by informing a contour, color information, and the like of the object in the input RADAR image and inputting the overlapping image to the detection model. By sequentially combining the polarized image 905 and the synthesized image 907 and inputting the combined image to the detection model, the processor 110 may obtain accurate location information of the target object included in the input RADAR image from the polarized image 905 and obtain contour information or color information of the target object included in the input RADAR image from the synthesized image 907. As a result, the processor 110 may more accurately detect the target object from the input RADAR image 903.

The processor 110 according to the exemplary embodiment of the present disclosure may generate second result information relate to an individual area of each of the two or more target objects which do not overlap within the input image based on the first result information. The processor 110 may determine the individual area of each of the two or more discriminated target objects based on the first result information. The processor 110 may generate the second result information from the first result information generated so that the pixel which corresponds to the target object and the pixel which do not correspond to the target object within the input image have the different values. The processor 110 may generate the second result information based on the watershed algorithm from the first result information. The particular additional description for the watershed algorithm is discussed in more detail by "Min Bai, Raquel Urtasun, 'Deep Watershed Transform for Instance Segmentation', In CVPR, 2017" which is incorporated herein by reference in its entirety.

Figure 6:
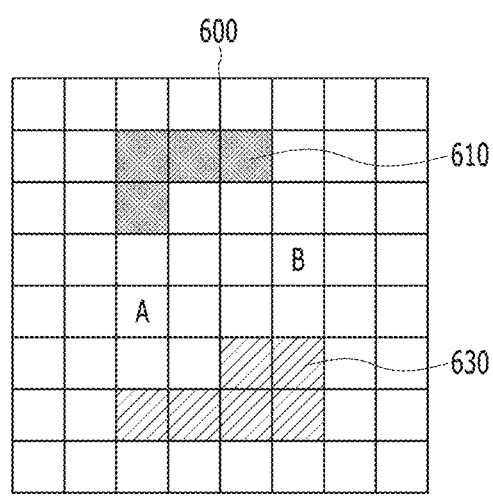
FIG. 6 is an example diagram visually illustrating a result of dividing an individual area of each of two or more target objects that do not overlap each other based on second result information according to the exemplary embodiment of the present disclosure.

FIG. 6 is an example diagram visually illustrating a result of dividing an individual area of each of two or more target objects that do not overlap each other based on the second result information according to the exemplary embodiment of the present disclosure. The processor 110 may generate output data 600 for each instance that divides an individual area of each of two or more target objects illustrated in FIG. 6 from single-channel output data ( ) illustrated in FIG. 5. The processor 110 may generate the output data 600 for each instance by performing the watershed algorithm operation on the single-channel output data ( ). The single-channel output data ( ) is an example for describing the present disclosure, and is output data generated for the input image 510 of FIG. 4. The output data 600 for each instance may also be generated from the single-channel output data ( ), so that the output data 600 for each instance is output data generated for the input image 510 of FIG. 4. In this case, the single-channel output data ( ) may have the same pixel value for the target objects even though the target objects are discriminated from each other. However, the output data 600 for each instance may have a different pixel value for each of the two or more target objects which do not overlap each other. For example, the output data 600 for each instance may have a value of "1" for a first target instance 610 and a value of "2" for a second target instance 630. The foregoing example is illustrative for description, and does not limit the present disclosure. As described above, when the different pixel values are assigned to the plurality of target objects, respectively, included in the input image by generating the second result information, the processor 110 may assign ID information to each of the target objects. When an ID that is a unique value is assigned to the individual target object, the processor 110 may individually manage a change of the individual target object over time.

The processor 110 according to the exemplary embodiment of the present disclosure may calculate individual contour information about each of the two or more target objects based on the second result information. The processor 110 may calculate individual contour information about each of the target objects based on the second result information. The individual contour information according to the present disclosure may be calculated based on the multi-channel output data generated in the process of generating the second result information and the first result information. In particular, the processor 110 generates the second result information based on the first result information, and the first result information is generated by performing, by the processor 110, the operation through the neural network-based detection model. In this case, the first result information is generated based on the multi-channel output data generated by the detection model. The first channel of the multi-channel output data includes the contour information of the target object, so that the processor 110 may check the unique ID of each object from the second result information and obtain the contour information of the target object corresponding to the object having the unique ID confirmed from the first channel of the multi-channel output data. The processor 110 may calculate the individual contour information based on the second result information and store the individual contour information about the individual target object in the memory 130. When the individual contour information is stored in the memory 130 according to a time order, the processor 110 has the effect of tracking the change in the appearance of the target object having each unique ID from the individual contour information according to the time order.

Figure 7:
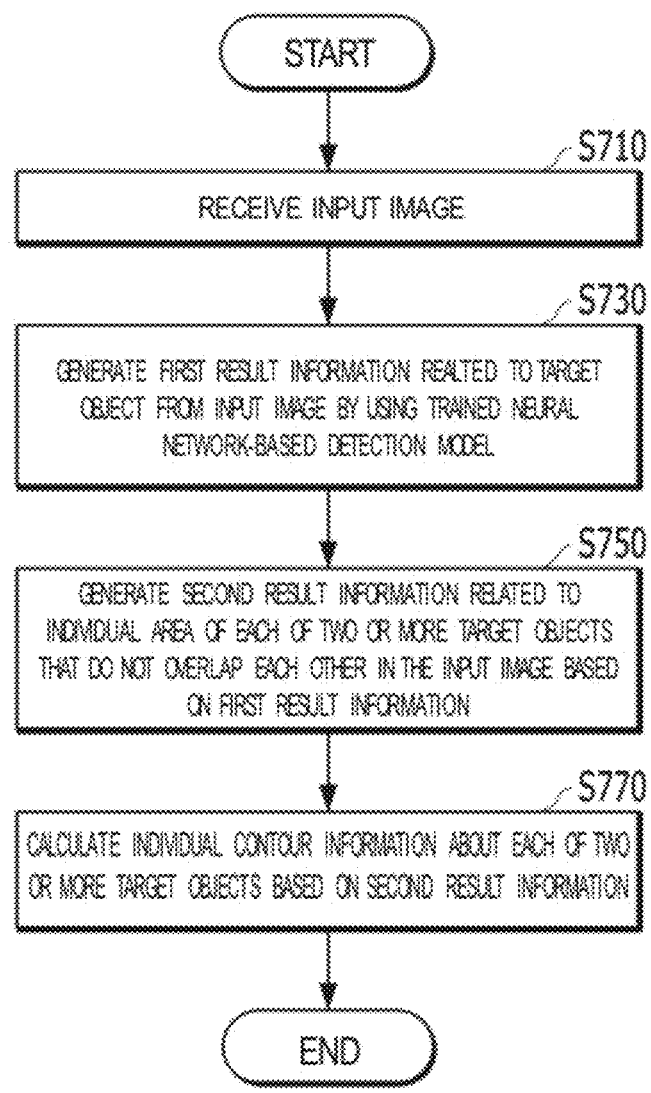
FIG. 7 is a flowchart illustrating a process of detecting a target object from an input image by a computing device according to the exemplary embodiment of the present disclosure.

FIG. 7 is a flowchart illustrating a process of detecting a target object from an input image by a computing device according to the exemplary embodiment of the present disclosure. It will be apparent to those skilled in the art that only some of the operations described in FIG. 7 may configure each operation of the target object detection method, and additional operations may be added to the target object detection method. The processor 110 may receive an input image in operation S710. The input image may also be received through an input unit of the computing device 100, and may also be received from an external device through the network unit 150 of the computing device 100. The processor 110 may generate first result information related to a target object in the input image by using a trained neural network-based detection model in operation S730. The trained neural network-based detection model may be trained based on GT data having the plurality of channels. The plurality of channels included in the GT data may be formed of two or more among a first channel including contour information of the target object, a second channel including adjacent area information about an area adjacent between two different target objects, and a third channel including target area information. The processor 110 may generate multi-channel output data from the input image by using the trained detection model. The multi-channel output data may include at least two corresponding channels among the first channel including contour information of the target object, the second channel including adjacent area information about an area adjacent between two different target objects, and the third channel including target area information according to the configuration of the channel included in the GT data based on which the detection model is trained. The processor 110 may generate single-channel output data from the multi-channel output data and generate first result information based on the single-channel output data. For example, the processor 110 may generate the single-channel output data by adjusting a pixel value included in the third channel based on the first channel or the second channel included in the multi-channel output data. The processor 110 may generate second result information related to an individual area of each of two or more target objects which do not overlap each other within the input image based on the first result information in operation S750. The second result information may include information related to the individual area of each of the two or more target objects which do not overlap each other. The processor 110 may generate the second result information by applying the watershed algorithm to the first result information. The first result information may be the information generated as a result of the performance of the semantic segmentation operation on the input image by the processor 110. The second result information may be the information generated as a result of the performance of the instance segmentation operation by the processor 110 on the input image based on the first result information. The processor 110 may assign a unique ID to each of the two or more target objects based on the second result information. The processor 110 may calculate the individual contour information about each of the two or more target objects based on the second result information in operation S770. The processor 110 may detect a change in appearances of the individual target objects each of which has the unique ID based on the calculated individual contour information.

Figure 8:
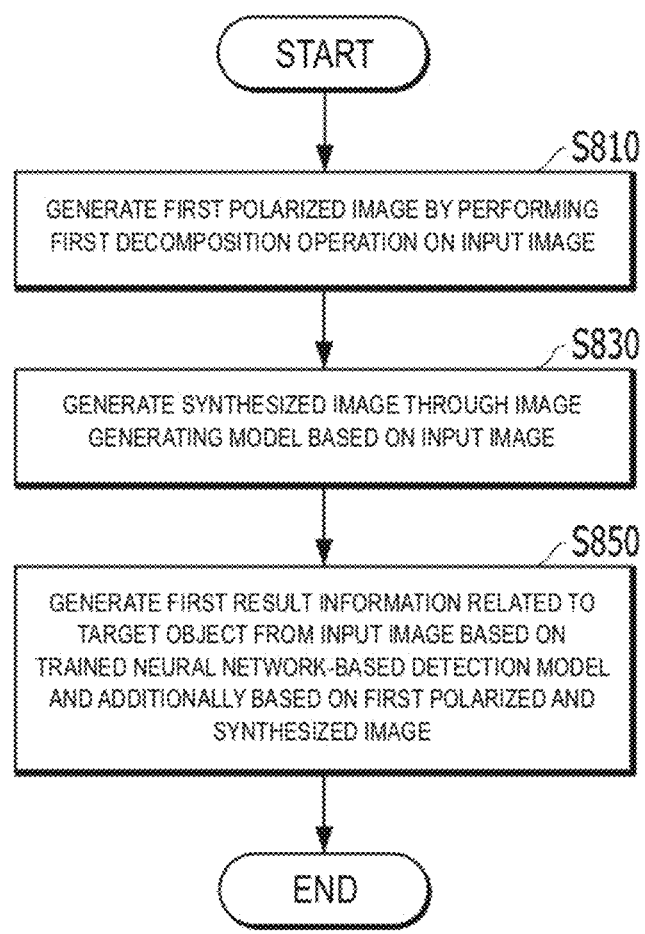
FIG. 8 is a flowchart illustrating a pre-processing process performed on an input image by the computing device according to the exemplary embodiment of the present disclosure.

FIG. 8 is a flowchart illustrating a pre-processing process performed on an input image by the computing device according to the exemplary embodiment of the present disclosure. Each operation of the pre-processing process illustrated in FIG. 8 may be performed by the processor 110 in the case where an input image is a RADAR image generated based on a RADAR signal. The processor 110 may generate a first polarized image by performing a first decomposition operation on the input image in operation S810. The processor 110 may generate a synthesized image through an image generating model based on the input image in operation S830. The image generating model may be a neural network-based model which performs work of converting the input image so as to have a similar style to that of an actual optical image. The image generating model may be trained based on the GAN learning algorithm. The synthesized image may be generated as a result of the input of the first polarized image to the image generating model. The synthesized image may also be generated as a result of the input of a second polarized image to the image generating model. In this case, the second polarized image may be based on a different algorithm from that of the first polarized image. Operations S810 and S830 may be performed by the processor 110 sequentially or in parallel. The processor 110 may generate the first result information related to the target object in the input image based on the trained neural network-based detection model and additionally based on the first polarized image and the synthesized image in operation S850. The processor 110 may generate the first result information by overlapping the first polarized image and the synthesized image and inputting the overlapping image to the detection model. The processor 110 may also input a combined image generated by sequentially combining the first polarized image and the synthesized image to the detection model.

Figure 10:
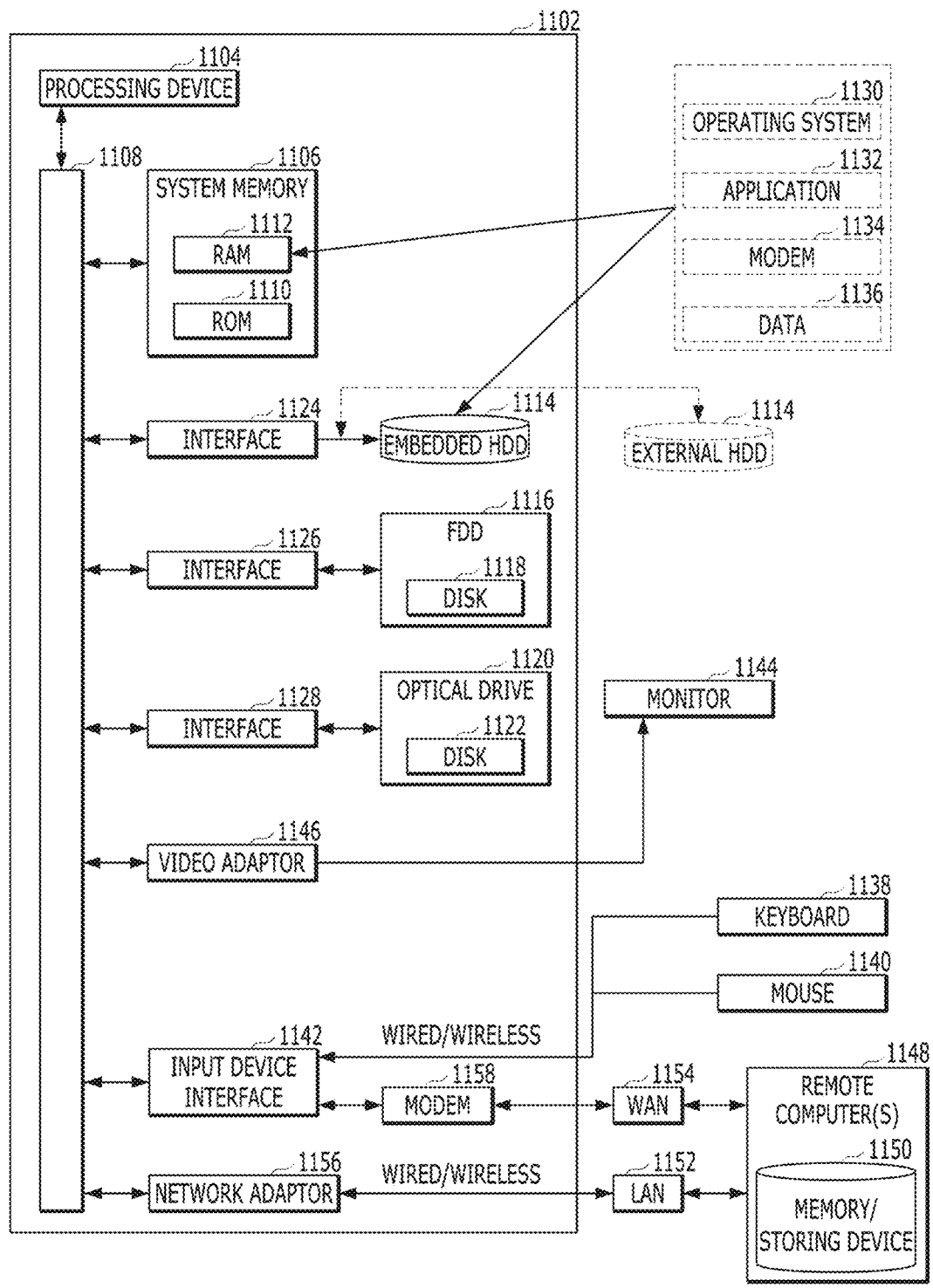
FIG. 10 is a simple and general schematic diagram illustrating an example of a computing environment in which several exemplary embodiments of the present disclosure are implementable.

FIG. 10 is a simple and general schematic diagram illustrating an example of a computing environment in which several exemplary embodiments of the present disclosure are implementable. The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method of detecting a target object performed by a computing device including at least one processor, the method comprising:
   receiving an input image; and
   generating first result information related to a target object of a plurality of target objects from the input image based on a neural network-based detection model trained based on a training data set including at least one training image and Ground Truth (GT) data corresponding to each training image,
   wherein the GT data includes a channel including adjacent area information about an area adjacent between the target object and another of the plurality of target objects, wherein the channel comprises a data set having a value allocated to at least one pixel included in the input image.

2. The method of claim 1, wherein the training data set is generated based on an incremental operation that generates a plurality of new training image-GT data pairs from at least one existing training-image-GT data pair, and is generated before being input to the detection model for training the detection model.

3. The method of claim 1, wherein the GT data further includes a channel including contour information about the target object.

4. The method of claim 1, wherein the GT data further includes:
   a channel including contour information about the target object; and
   a channel including target area information.

5. The method of claim 1, wherein the generating of the first result information includes generating single-channel output data based on multi-channel output data generated from the input image by the detection model.

6. The method of claim 5, wherein the generating of the single-channel output data includes adjusting a value included in a third channel based on at least one of a first channel and a second channel of the multi-channel output data, and the multi-channel output data includes:
a first channel including contour information about the target object;
a second channel including adjacent area information about an area adjacent between two different target objects; and
a third channel including target area information.

7. The method of claim 6, wherein the adjusting includes:
changing at least a part of values allocated to an area corresponding to a contour determined based on the first channel to a background value in the third channel; and
changing at least a part of values allocated to an area corresponding to an adjacent area determined based on the second channel to a background value in the third channel.

8. The method of claim 1, further comprising:
generating a first polarized image by performing a first decomposition operation on the input image; and
generating a synthesized image through an image generating model based on the input image,
wherein the generating of the first result information includes generating the first result information related to the target object from the input image additionally based on the first polarized image and the synthesized image.

9. The method of claim 1, further comprising:
generating second result information related to an individual area of each of the two or more target objects that do not overlap each other within the input image based on the first result information.

10. The method of claim 9, further comprising:
calculating individual contour information about each of the two or more target objects based on the second result information.

11. A non-transitory computer readable storage medium storing a computer program, wherein when the computer program is executed by one or more processors, the computer program causes following operations for detecting a target object to be performed, the operations comprising:
receiving an input image; and
generating first result information related to a target object of a plurality of target objects from the input image based on a neural network-based detection model trained based on a training data set including at least one training image and Ground Truth (GT) data corresponding to each training image, and
the GT data includes a channel including adjacent area information about an area adjacent between the target object and another of the plurality of target objects, wherein the channel comprises a data set having a value allocated to at least one pixel included in the input image.

12. An apparatus for detecting a target object, the apparatus comprising:
one or more processors;
one or more memories; and
a network unit,
wherein the one or more processors receive an input image, and generate first result information related to a target object of a plurality of target objects from the input image based on a neural network-based detection model trained based on a training data set including at least one training image and Ground Truth (GT) data corresponding to each training image, and
the GT data includes a channel including adjacent area information about an area adjacent between the target object and another of the plurality of target objects, wherein the channel comprises a data set having a value allocated to at least one pixel included in the input image.

* * * * *